United States Patent [19]

Ogi

[11] 4,261,947

[45] Apr. 14, 1981

[54] METHOD FOR MANUFACTURING HOLLOW PLASTIC ARTICLES BY JOINING HOLLOW MOLDED PORTIONS BY A MOLDED JOINT

[76] Inventor: Yoshio Ogi, 2169-3, Negata, Hamakita City, Shizuoka Pref., Japan

[21] Appl. No.: 18,299

[22] Filed: Mar. 7, 1979

Related U.S. Application Data

[60] Division of Ser. No. 865,698, Dec. 29, 1977, Pat. No. 4,155,478, which is a continuation of Ser. No. 683,468, May 5, 1976, abandoned.

[30] Foreign Application Priority Data

May 12, 1975 [JP] Japan .................................. 50-55691

[51] Int. Cl.³ .......................... B29C 27/00; B29F 1/00
[52] U.S. Cl. ................................... 264/263; 264/248; 264/267
[58] Field of Search ........................ 264/263, 248, 267

[56] References Cited

U.S. PATENT DOCUMENTS

| | | | |
|---|---|---|---|
| 1,494,523 | 5/1924 | Zwicker | 264/263 X |
| 1,789,642 | 1/1931 | Wirth | 264/263 |
| 2,388,042 | 10/1945 | Daily | 264/263 X |
| 3,264,394 | 8/1966 | Gohl | 264/263 |
| 3,893,777 | 7/1975 | Jones | 264/263 X |
| 3,920,787 | 11/1975 | McDowell et al. | 264/263 |
| 3,975,490 | 8/1976 | Lapeyre | 264/248 X |

FOREIGN PATENT DOCUMENTS

| | | | |
|---|---|---|---|
| 2206588 | 8/1973 | Fed. Rep. of Germany | 264/263 |
| 1200522 | 12/1959 | France | 264/263 |
| 1303377 | 7/1962 | France | 264/263 |
| 1537472 | 12/1978 | United Kingdom | 264/263 |

OTHER PUBLICATIONS

Whittington, Lloyd R., "Whittington's Dictionary of Plastics", Stamford, Conn., Technomic, ©1968, pp. 179-181.

*Primary Examiner*—Philip Anderson
*Attorney, Agent, or Firm*—James E. Nilles

[57] ABSTRACT

A method of making a plastic article and in particular a hollow plastic article having reinforcing ribs or ridges in the inner side such as an air cleaner casing, a tank or an airtightly closed float. The plastic article comprises at least two separately molded portions and at least one molded joint portion which is molded in jointing grooves formed between opposed dividing end faces of the molded portions, the molded joint portion and the separately molded portions being united into one body by fusing at their contact surfaces. The method of manufacturing the plastic article consists of at least two separately molded plastic portions or parts, in particular a method for jointing two plastic portions or parts which are molded separately, comprises steps of providing a groove and/or cutout extending along each of the dividing end faces of the molded portions to be jointed, holding said molded portions in a position of desired assembled relationship to provide a jointing groove extending between the opposed dividing end faces and being opened to the outside, filling said jointing groove with heated and plasticized or molten plastic material by injection molding, extruding molding or casting molding at such a temperature that the plastic material injected, extruded or poured into the jointing groove fuses the plastic material of the molded portions at their contact surfaces and thereby upon cooling and hardening, the molded portions are united into one body through the molded joint portion to provide a rigidly and integrally connected plastic article.

2 Claims, 3 Drawing Figures

FIG. 1
FIG. 2
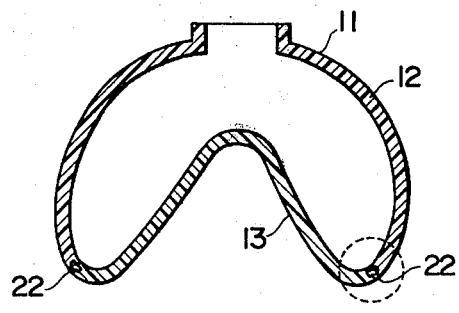
FIG. 3
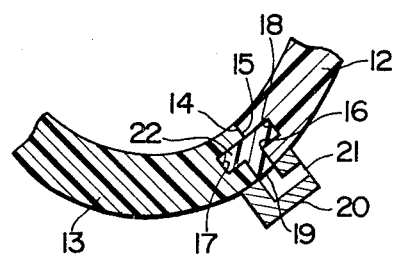

METHOD FOR MANUFACTURING HOLLOW PLASTIC ARTICLES BY JOINING HOLLOW MOLDED PORTIONS BY A MOLDED JOINT

REFERENCE TO RELATED CO-PENDING APPLICATION

This is a divisional application from U.S. Ser. No. 865,698 filed Dec. 29, 1977, which issued as U.S. Pat. No. 4,155,478 on May 22, 1979; which in turn is a continuation application from U.S. Ser. No. 683,468, filed May 5, 1976, and subsequently abandoned.

The present invention relates to the manufacture of shaped plastic articles from thermoplastic or thermosetting synthetic resin and in particular to shaped hollow plastic articles having a complicated inner and/or outer shape and also to a method of manufacturing such hollow plastic articles.

In case of manufacturing hollow plastic articles or containers, such as gasoline tanks and air cleaner casings for use in an automobile, since such containers usually have reinforcing ribs, ridges or grooves formed in the inner side so that the containers could not be molded as a hollow one-piece article, such a hollow plastic article usually has been manufactured by dividing two or more portions which may be molded separately by an adequate molding process such as compression molding, cast molding, injection molding, extrusion molding or the like and thus molded portions are mechanically fastened together by joining or clamping at their flange portions with gaskets interposed therebetween to provide a desired hollow article.

Although the hollow article consisting of two or more separately molded portions fastened together by means of a mechanical joint has an advantage in that there is the capability of disassembling the molded portions from each other, there is the disadvantage that the joint may be loosed by any vibration while the container is in use and this has resulted in leakage or other faults.

It is also well known to bond the molded portions by use of adhesive, but it is difficult to provide a high bond strength sufficient to resist any destructive shock or the like and the use of adhesive is inadequate for containers receiving a solution or liquid which is a solvent for the adhesive.

It is an object of the present invention to provide a new plastic article consisting of separately molded portions and also to provide a new method of manufacturing such a plastic article by providing a molded joint portion of thermoplastic material such as polyethylene, polypropylene or the like between the molded portions by means of injection molding, extrusion molding or the like.

The inventor has studied and experimented with the method for joining molded portions to provide a hollow plastic article such as a container or a casing with reinforcing ribs formed on the inner wall. According to the invention, the separately molded portions are provided with grooves or cutouts extending along the divided end faces to be joined of the molded portions, respectively, and held in a position of desired assembled relationship so as to provide jointing grooves which are opened to the outside between the end faces by said grooves or cutouts. Subsequently, plastic material is molded into said jointing grooves by injection molding or extrusion molding at such a temperature that the injected or extruded plastic material fuses the plastic material in the contact surface of the end faces of the molded portions and thereby upon cooling or hardening the molded portions are united by the molded joint portion in the jointing groove between the molded portions to provide a united hollow plastic article having high strength with a relatively thin wall and being gas-tightly sealed.

The present invention is also applicable for fiber glass reinforced plastic containers molded from thermosetting plastic material such as epoxy resin, unsaturated polyester and the like, as well as the above mentioned thermoplastic containers. In case of manufacturing such fiber reinforced plastic containers, the jointing groove formed between two molded fiber reinforced plastic portions is filled with fiber glass and then molten thermosetting plastic material is poured into the jointing groove by the casting molding to mold a molded joint portion which is united with the molded fiber reinforced plastic portions at their contact surfaces therebetween and thus to provide a high adhesion strength and effective gas seal.

The plastic article according to the present invention comprises at least two separately molded portions and at least one molded joint portion which is molded in jointing grooves formed between dividing end faces of said molded portions, said molded joint portion and said molded portions being united into one body by fusing at their contact surfaces. In an embodiment of the present invention, said molded joint portion may be extended along the whole periphery of the article. In a further embodiment of the invention, the jointing groove may be provided by grooves and/or cutouts formed in the dividing end faces of the molded portions to be joined.

The method of manufacturing plastic article according to the present invention comprises steps of molding separately at least two divided plastic portions of the article, said molded portions being provided with grooves or cutouts extending along dividing end faces of the molded portions, holding said molded portions in a position of desired assemble relationship to provide a jointing groove extending between the opposed dividing end faces and being opened to the outside, filling said jointing groove with plastic material at such a temperature that said plastic material in the jointing groove and the plastic material of the molded portions are fused at their contact surfaces and hardening said plastic material to unite said molded portions into one body.

Other object and advantages of the invention will be apparent from the following description in conjunction with the accompanying drawing, wherein FIG. 1 is a vertical sectional view of an air cleaner casing according to the invention;

FIG. 2 is a vertical sectional view of a gasoline tank according to the invention; and FIG. 3 is an enlarged sectional view of a molded portion of the tank of FIG. 2.

Referring now to the drawing, FIG. 1 shows an air cleaner casing 1 manufactured in accordance with an embodiment of the present invention. The casing 1 comprises two molded portions which may be separately molded by a conventional molding process and which may be made of polyethylene.

The molded portions 2 and 3 are provided at the dividing stepped end faces 4 and 5 thereof with grooves 7, 7 and cutouts 8, 8 at the corresponding zones so as to provide a substantially key-shaped jointing groove (7, 8) extending around the outer periphery of the article and being opened to the outside at an outer peripheral opening 9 when the molded portions 2 and 3 are assembled by abutting the dividing end faces 4 and 5 to each other, as is shown in FIG. 1.

The assembled molded portions 2 and 3 may be inserted into a metal mold, not shown, and then heated and plasticized polyethylene from an injection molding machine or extruding machine, not shown, connected to the metal mold is injected or forced into the jointing groove 7, 8 through a duct, not shown, in the metal mold and through an opening 9 opened at the outer periphery 6 of the molded portions 2 and 3 and is cooled and hardened in the jointing groove to provide a molded joint portion 10 thereat.

The injected or extruded plastic material may be plasticized (or plastified) by heat and has a temperature sufficient to melt the plastic material of the molded portions 2 and 3 when they are contacted to each other so that it fuses the plastic material of the molded portions 2 and 3 at their contact surfaces and upon cooling and hardening to provide a molded joint portion 10 which is united with the molded portions 2 and 3 and thereby connects the molded portions rigidly and provides an airtight seal between the abutting end faces 4 and 5.

FIG. 2 shows a gasoline tank 11 for an autocycle according to the present invention. The tank 11 may be divided into two molded portions 12 and 13, each of which may be molded separately in accordance with the Prepreg Mat die process by using unsaturated polyester mixed with glass fibers as reinforcing material.

The molded portions 2 and 3 are provided with grooves 17 and cutouts 18, respectively, extending along the abutting end faces 14 and 15 in the same manner as described in the embodiment of FIG. 1.

The molded portions 12 and 13 may be held in a position of desired assembled relationship by means of suitable jigs or fixtures and thereby the grooves 17 and cutouts 18 forms jointing grooves 17, 18 extending between the opposed end faces 14 and 15 and having an opening 19 which is opened at the outer periphery 16. Subsequently, the jointing grooves 17, 18 may be surrounded by means of a wood mold or cover plate 20 mounted outside the opening 19 at the outer periphery 16, after which the jointing groove may be filled with glass fibers, if necessary and then unsaturated polyester sol is poured into the jointing groove through an inlet 21 in the cover plate 20 and is hardened in accordance with the casing molding process to provide a molded joint portion 22. In molding the joint portion 22, unsaturated polyester sol may be mixed with short lengths of glass fibers in 20-30% by weight instead of the above mentioned filling with glass fibers.

Thus, molded joint portion 22 is also united with the molded portions 12 and 13 at their contact surface in the same manner as described in the embodiment of FIG. 1 and thereby connects both molded portions 12 and 13 rigidly and provides an airtight seal between the abutting end faces 14 and 15.

As will be apparent from the foregoing, the present invention provides a hollow plastic article of relatively light weight and high strength having a thin wall provided at the inner side thereof with reinforcing ribs and also provides an airtight hollow plastic article and, therefore, the present invention is applicable for floats of fishing nets and capsules for accomodating instruments therein, etc. as well as the aforementioned casing and tanks.

I claim:

1. A method of manufacturing a plastic container comprising the steps of molding separately of thermoplastic resin material at least two divided portions of said container, said molded portions each being provided with a dividing end face and at least one molded portion being provided with a cutout extending along the dividing end face thereof, holding said molded portions in a position of desired assembled relationship to provide a key-shaped jointing groove including said cutout and extending between the opposed dividing end faces and having an opening at the outer periphery of the portions for said container, filling by forcible injection, said key-shaped jointing groove with a thermoplastic resin material which is heated at such a temperature that said thermoplastic resin material is in plastified form and that the heated thermoplastic resin material filled in said key-shaped jointing groove heats, melts and fuses the thermoplastic resin material of said divided portions at the surfaces in said jointing groove which are contacted by the molten thermoplastic resin material, and cooling said thermoplastic resin material in said groove and that fused thereby to effect hardening thereof and to unite said molded portions into one body.

2. A method according to claim 1 wherein said plastic material is thermoplastic synthetic resin with glass fibers.

* * * * *